Aug. 30, 1949.    W. H. KELEHER    2,480,479
MEATHOOK
Filed Nov. 18, 1946
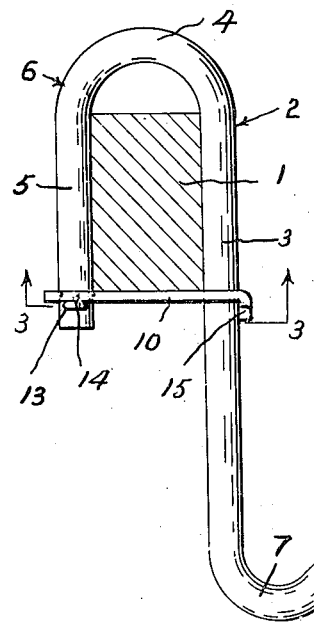
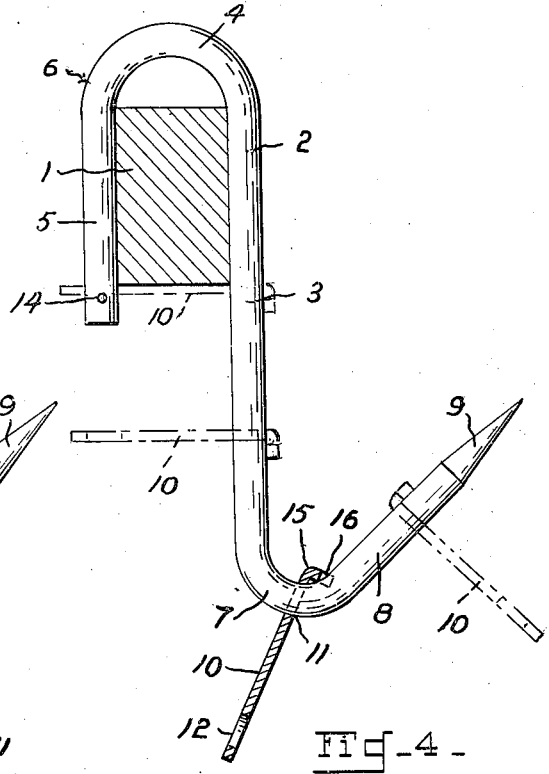
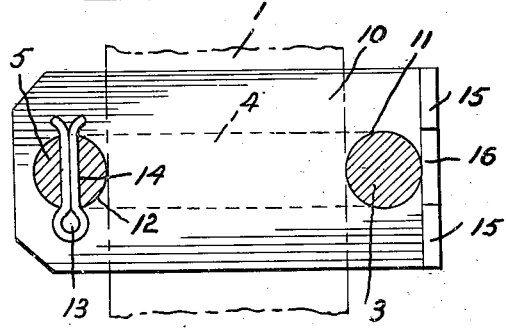
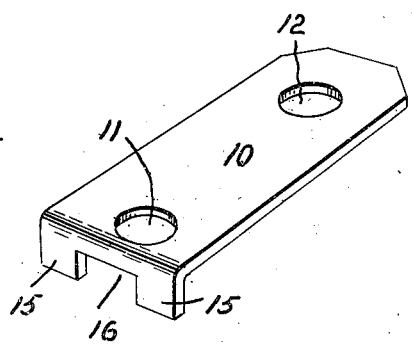
Inventor:
W. H. Keleher,
By C. C. Hines,
Attorney.

Patented Aug. 30, 1949

2,480,479

UNITED STATES PATENT OFFICE 2,480,479

MEATHOOK

William H. Keleher, Chicago, Ill., assignor to Merchants Despatch Transportation Corporation and Northern Refrigerator Line Incorporated, both corporations of Delaware Application November 18, 1946, Serial No. 710,591

2 Claims. (Cl. 248—215)

This invention relates to certain new and useful improvements in meat hooks, and particularly to meat hooks of the type employed for supporting sides of meat from meat rails.

In the transportation of sides of beef, pork, lamb, etc., in refrigerator cars, for example, the meat is hung from hooks attached to a system of meat rails suspended from the ceilings of the cars. The meat is carried into the refrigerator cars at the packing plants and hooked over prearranged patterns of hooks previously placed on the rails in the cars. The hooks are of the S type, one terminal portion of each of which is formed to hook over the meat rail while the other terminal portion is pointed and provides a prong to hold the meat. The meat rails run longitudinally of the car and are usually 7 or 8 in number. At destination, the meat is unhooked and taken into the storage plant with the hooks remaining in the car. The hooks are stamped with the car owner's initials and are the property of the car owner. Generally the hooks are made of tinned black metal and require periodic steaming and cleaning in accordance with legal sanitary rules enforced by packing house inspectors.

The number of hooks used in an average refrigerator car varies from 100 to 200 hooks, and inasmuch as the present day loose or non-permanent hooks are merely hooked over the meat rails, many are lost by being carelessly or inadvertently removed with the meat instead of being left in the car, and some are deliberately pilfered for use in small packing houses and butcher shops. This results in considerable loss to the car owners in replacements.

So-called "permanent" hooks which have a complete loop around the meat rail and must be installed at the time the meat rails are placed in the car, or those which are placed in after the meat rails are installed and have flanges which are hammered over to complete closing loops fastening them to the rails, have the disadvantage that they cannot be removed for steaming and cleaning. This has resulted in the banning of cars with "permanent" loops from many packing houses.

The object of the present invention is to provide a meat hook which overcomes the aforesaid objections to loose and permanent hooks, and which furnishes a "semi-permanent" hook which embodies a compromise construction between a loose and a permanent hook, such construction adapting it to be slidably removed in a ready manner for cleaning and steaming when required, while preventing its rotation to a releasing position or its accidental displacement or removal and at the same time rendering it sufficiently difficult of sliding removal to discourage and give a large measure of protection against direct pilferage.

With this and other objects in view, the invention consists of a meat hook comprising certain novel features of construction, combination and arrangement of parts hereinafter more fully described and claimed, and as shown in the accompanying drawing, in which:

Fig. 1 is a cross-section through a meat rail showing in side elevation a meat hook embodying the invention applied thereto and fastened in place thereon.

Fig. 2 is a similar view showing in section and dotted lines the latch plate in some of the different positions it occupies in the operation of applying or removing it.

Fig. 3 is a sectional view on the line 3—3 of Fig. 1.

Fig. 4 is a perspective view of the latch plate.

Referring now more particularly to the drawing, 1 designates a meat supporting rail of the character set forth, and 2 a hook of the novel and improved construction for supporting a side of meat from the rail.

The hook 2 is of generally S-formation and comprises a main, vertically disposed body or shank portion 3 terminating at its upper end in a U-bend 4 and a depending arm 5 spaced with relation to and arranged parallel with substantially the upper half of the shank portion 3 to form a saddle, hook or loop 6 normally open at its lower end to adapt it to be engaged with and supported upon the rail 1, as shown. The lower half of the shank portion 3 terminates in an outwardly bent part 7 and a prong 8 having a pointed free end 9 and extending outwardly and upwardly at an oblique or other suitable angle relative to the shank and forming an impaling hook on which meat is hung. The hook proper as thus constructed may be made of rod-like metal of the kind generally employed and of circular or other suitable cross-section.

A hook of the construction so far described, of loose hook type, is adapted to be easily applied to and removed from the rail, and is thus free from the disadvantages of a permanent hook, but it is also subject to displacement and is liable to be freed and to drop off or to be carried with the meat when the meat is taken away, and it is also easily subject to pilferage. The present invention provides a fastening means which overcomes these objections, while retaining in general the advantages of a loose hook, and which gives a substantial degree of protection against displacement, casual loss or pilferage of the hook.

The fastening means provided for the purpose comprises a latch plate 10 of suitable width, of generally oblong rectangular form, and of a length somewhat greater than the distance between the shank 3 and lower end of the arm 5. This plate is provided adjacent its ends with openings 11 and 12 to adapt it to be fitted upon and slidably engaged with the shank and arm and applied and removed along the shank 3 and via the prong or hook 8. When applied the plate is arranged to bridge across the space between the shank and lower end of the arm beneath the rail as shown in Fig. 1, to close the open end of the saddle or rail engaging loop and, when secured in such position, to hold the hook 2 from displacement or removal from the rail. To secure the latch plate in place a fastening member, such as a cotter pin 13 as shown in the present instance, may be employed, which is passed through an opening 14 in the arm 5 beneath the apertured end 12 of the plate, but other suitable fastening or locking means may be used in place of the cotter pin, according to the degree of security designed to be afforded by the fastening means.

The apertured ends 11 and 12 of the plate project sufficiently beyond the shank 3 and arm 5 to form finger pieces whereby the plate may be conveniently handled. At the apertured end 11 there is also provided a downbent bifurcated flange 15, located close to or directly at the edge of the aperture, to facilitate handling and to also serve as a guide and guard member to guide the plate in its applying and removing movement about the bend 7 and to require a certain degree of accuracy particularly in its sliding removal in order to prevent its too ready removal by an intending pilferer. This flange is provided with a clearance recess 16 which divides the flange to form stop lugs at opposite sides thereof. The flange at the end 11 further serves as an abutment or stop member to engage the shank of the hook and prevent this end of the latch plate from sagging or dropping down from a horizontal position. The described location of the flange also adapts it to lie constantly close to the shank of the hook so that no meat can lodge between the same and the hook to cause an unsanitary condition. It will be obvious that the stop lugs or guide fingers 15 formed by the spaced portions of the flange are so arranged as to prevent rotation of the latch plate to releasing position during the outward movement of the plate along the bend, and to slidably guide the plate on the bend until it passes beyond the bend to a full releasing position.

In applying the safety latch plate the apertured end 11 is slipped over the point end 9 of the prong 8 and the plate slid around the bend 7 and up along the shank 3, as will be readily understood by reference to Fig. 2, until its apertured end 12 is brought beneath the arm 5 with which its aperture is engaged and the cotter pin 13 applied to hold the plate in hook-fastening position. When the hook is so applied and secured it will be held from displacement or removal with the meat and thus is prevented from being dropped into the car or casually lost or misplaced. As while the hook may be readily freed by removably withdrawing the pin 13, its entire removal from the rail 1 cannot be effected until the fastened plate has been moved outward to a position beyond the bend 7. Until the plate has been moved to this position the part 6 cannot be lifted off the rail as the plate will lie in the path of the rail and prevent lifting movement of part 6 from the rail until the plate has been moved to or outwardly beyond the position shown in full lines in Fig. 2. It will be obvious that in the movement of the plate outward to a position beyond the bend 7 the plate maintains an angular retaining position in which it prevents disengagement of the part 6 from the rail 1 until it has passed beyond the bend 7 and onto the prong 8 and that the clearance recess 16 permits the plate to be slidably shifted around the bend and onto the prong, but that in this operation the lugs or fingers 15 at the opposite sides of the recess also prevent the plate, before it reaches the prong, from being rotated upward to a releasing position on the bend 7 as an axis. Hence at this point the plate must be precisely moved to shift it to a releasing position, which involves the expenditure of a certain amount of time, care and skill in its manipulation, sufficient to make it difficult for a pilferer to remove the hook without liability of detection or fear of being detected in the act. Furthermore, the flange 15 serves as a guide to indicate which end of the plate should be engaged with the prong in applying the plate and disposing it in fastening position.

It will thus be seen that the invention provides what may be termed a "semi-permanent meat hook" which is a compromise between the open hook and the permanent hook and free from the objections thereto. It is removable, in that the cotter key can be withdrawn, the latch plate taken off, the hook taken down from the meat rail, and the three parts—the hook, the plate and the cotter key—subjected to cleaning and steaming. It affords substantial protection against casual losses and it also affords considerable protection against direct pilferage, as there is just enough time and work involved in removing the cotter pin and latch plate to cause the pilferer, for fear of detection, to leave the car so equipped alone, and to locate a car having open hooks which he can take with very little trouble.

The use of this "semi-permanent" hook thus affords substantial advantages to refrigerator car owners and other users in preventing losses of hooks while permitting authorized removal of hooks when required for treatment to keep them in a sanitary condition.

From the foregoing description, taken in connection with the drawing, the construction, mode of operation and advantages of the invention will be readily understood by those versed in the art without a further and extended description. While the exemplified construction shown is preferred, it is to be understood that changes in the form, construction and arrangement of parts, falling within the scope of the appended claims, may be made without departing from the spirit or sacrificing any of the advantages of the invention.

Having thus described my invention, I claim:

1. A meat hook comprising a body or shank including an upper part having a rearwardly and downwardly projecting arm at its upper end forming therewith an inverted U-shaped rail engaging portion and a lower part having an upwardly and forwardly projecting meat holding prong at its lower end joined thereto by an interconnecting bend; a latch plate apertured at one end to engage the free end of said arm and apertured at its opposite end for engagement with and sliding movements along the shank and prong and adapted to be engaged with the arm and an opposed portion of the upper part of the shank to bridge across and close said rail engaging portion at its base, and a fastening member adapted to be engaged with the arm beneath the first-named apertured end of the plate to secure the plate in bridging position, the second-named apertured end of the plate being provided with a downbent flange located in close proximity to its aperture so as to bear against the shank to support such end of the plate in bridging position and to guide the plate in its sliding movements along the shank and prong in applying said plate to and removing it from the meat hook.

2. A meat hook comprising a body or shank including an upper part having a rearwardly and downwardly projecting arm at its upper end forming therewith an inverted U-shaped rail engaging portion and a lower part having an upwardly and forwardly projecting meat holding prong at its lower end joined thereto by an interconnecting bend, a latch plate apertured at one end to engage the free end of said arm and apertured at its opposite end for engagement with and sliding movements along the shank and prong and adapted to be engaged with the arm and an opposed portion of the upper part of the shank to bridge across and close said rail engaging portion at its base, and a fastening member adapted to be engaged with the arm and the first-named end of the plate to secure the plate in bridging position, the second-named apertured end of the plate being provided with a downbent flange located in close proximity to its aperture so as to bear against the shank to support such end of the plate in bridging position, said flange being provided with a central aperture and guide fingers at opposite sides thereof to guide the plate in its sliding movements along the shank and prong in applying said plate to and removing it from the meat hook.

WILLIAM H. KELEHER.

REFERENCES CITED

The following references are of record in the file of this patent:

UNITED STATES PATENTS

| Number | Name | Date |
|---|---|---|
| 816,473 | Johnson | Mar. 27, 1906 |
| 829,239 | Thompson et al. | Aug. 21, 1906 |
| 1,433,133 | Harte | Oct. 24, 1922 |